Figure 1:
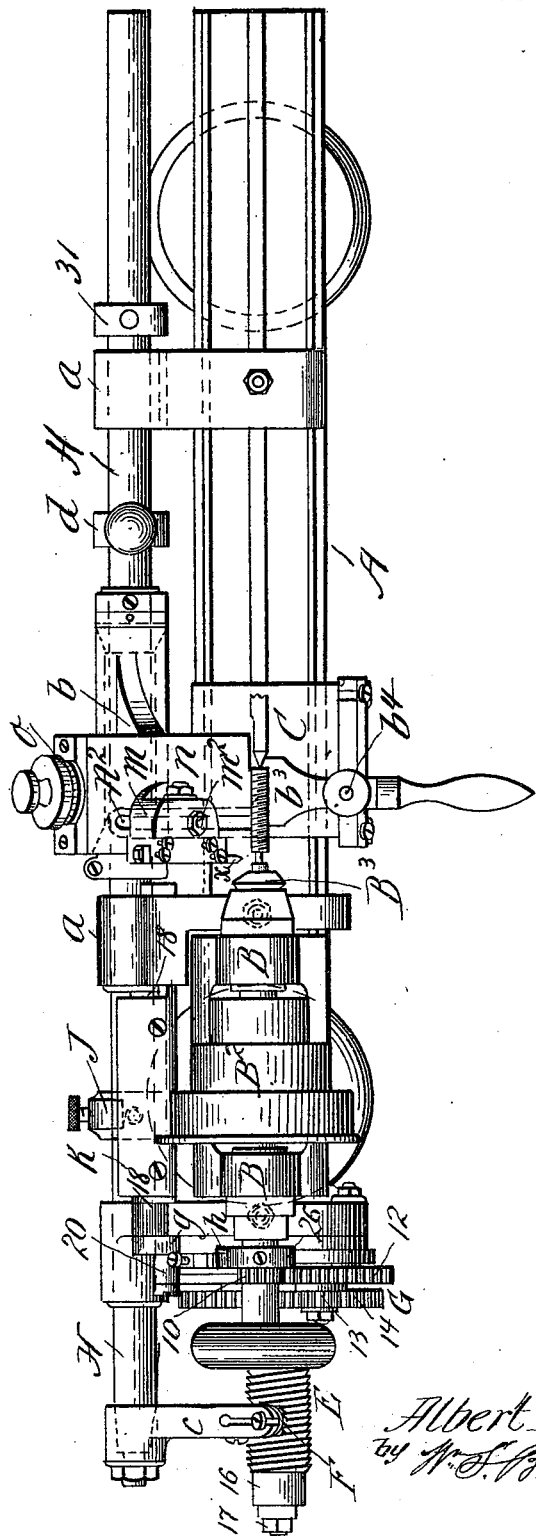

No. 631,576. Patented Aug. 22, 1899.
A. LATHAM.
SCREW CUTTING MACHINE.
(Application filed Sept. 2, 1898.)
(No Model.) 4 Sheets—Sheet 3.

Witnesses
Geo. E. Finch.
M. A. Campbell

Inventor
Albert Latham,
By W. F. Bellows, Attorney

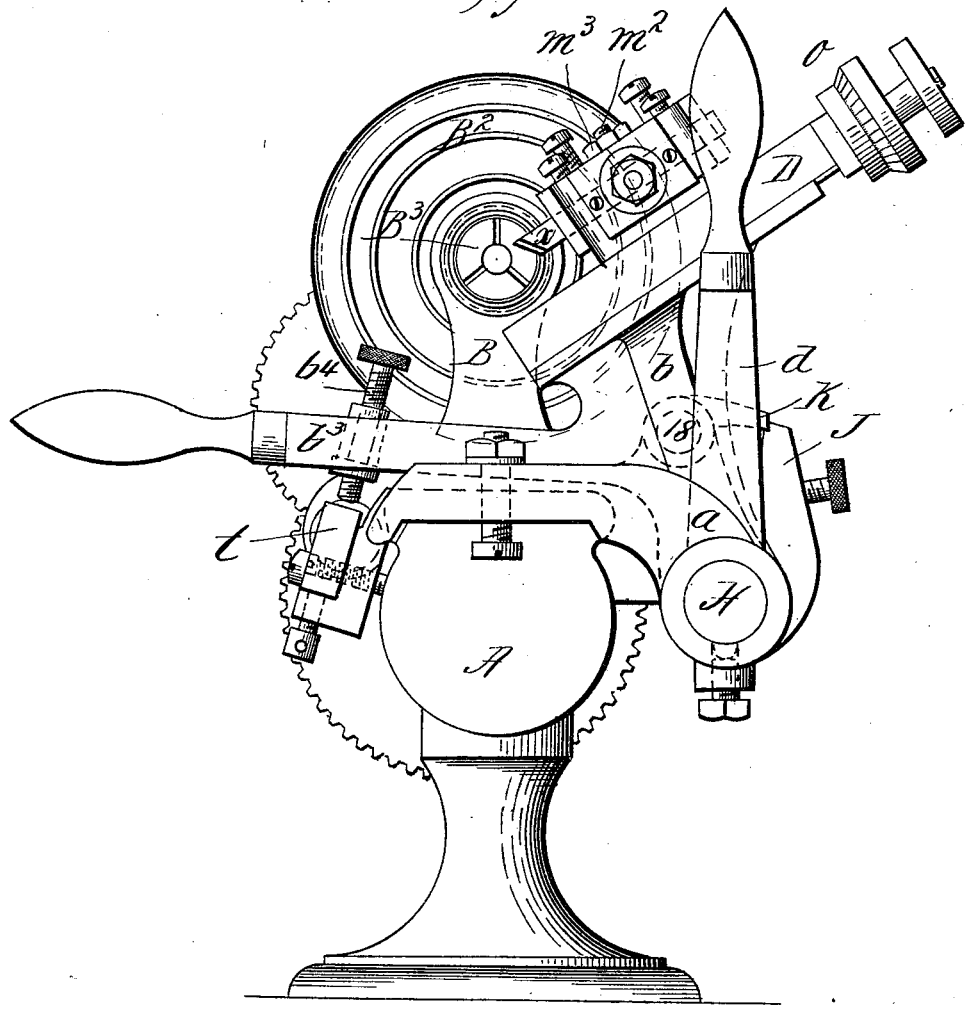

UNITED STATES PATENT OFFICE.

ALBERT LATHAM, OF SPRINGFIELD, MASSACHUSETTS.

SCREW-CUTTING MACHINE.

SPECIFICATION forming part of Letters Patent No. 631,576, dated August 22, 1899.

Application filed September 2, 1898. Serial No. 690,083. (No model.)

*To all whom it may concern:*

Be it known that I, ALBERT LATHAM, a citizen of the United States, and a resident of Springfield, in the county of Hampden and State of Massachusetts, have invented certain new and useful Improvements in Screw-Cutting Machines, of which the following is a specification.

This invention relates to improvements in screw-cutting lathes and screw-cutting machines, and is applicable to a form of lathe well known as the Fox lathe and to other analogous machines.

In screw-cutting lathes, as well known, the shaft or piece to be cut with a screw-thread is carried in a chuck or between centers of a head and tail stock and the cutting-tool is mounted for a cross-feed or for a longitudinal feed in relation to work chucked in the head-stock on a carriage which has a traveling motion imparted thereto in the direction of the length of the work, the travel of the tool-carriage being caused by a half-nut or threaded segment having engagement with the hob or feed-screw, so that the cutting-tool moves bodily in the direction of the length of the work at the same rate of speed and in unison with the traveling movement of the nut along the threads of the hob, said nut being provided as a connected part of the tool-carriage or is understood as an adjunct thereof. In the operation of these screw-cutting lathes the tool courses over the work, the tool being fed to cut to a suitable depth, usually necessarily less than the whole depth of the required thread, and then the tool is again brought to the commencement of its run, fed farther to take a second and deeper cut, and again course over the work, this recutting being repeated until the thread has been cut to the required depth. A great and serious difficulty in operating this class of lathes has been found in entering the thread-cutting tool on the repeated cutting, so that it will exactly bottom in the V or other shaped thread already cut instead of being presented haphazard, whereby it might gouge or work upon the side of the thread and finally chew it away. This difficulty has been found to arise in a serious way, especially where during each rotation of the hob the part being screw-cut has a different number of rotations or fractions of rotations—for instance, the cutter may have its bodily feed movement along the work by reason of the nut being in engagement with a hob having ten threads to the inch, the gearing between the hob and head-stock being such that the work rotates two-and-one-half times to every once of the hob to cut twenty-five teeth to the inch. It is thus seen that reckoning from a common point in the rotation of both the hob and the work the tool may only be presented into its proper cutting and true bottoming place in the partially-cut work on the runover once in every two-and-one-half turns of the work, corresponding to one complete turn of the hob, and manifestly where the changeable back gearing is arranged to give a more oddly-variable number of threads to the inch to the given number on the hob the coinciding instant when the tool may be entered into the work on the runover is even more difficult to ascertain and provide for.

The object of the present invention is to provide mechanism in the screw-cutting lathe or machine designed to cut any number of threads to the inch as the tool is fed along the work by the engagement of the nut in the threads of the hob, which mechanism serves to prevent the commencement of the feed of the tool-carrier until such time as the work has become so rotated that the point or center of the tool at the time of the runover is exactly coincident with the center of the helical cut previously made, said mechanism then operating to permit or insure the engagement of the nut with the hob or lead-screw and to insure the feed of the work, all without any possibility that the tool may be presented otherwise than exactly to correspond with its presentation for action on the work on the previous run.

In the accompanying drawings my invention is exemplified in a screw-cutting lathe such as I have devised and designed and in which—

Figure 2:
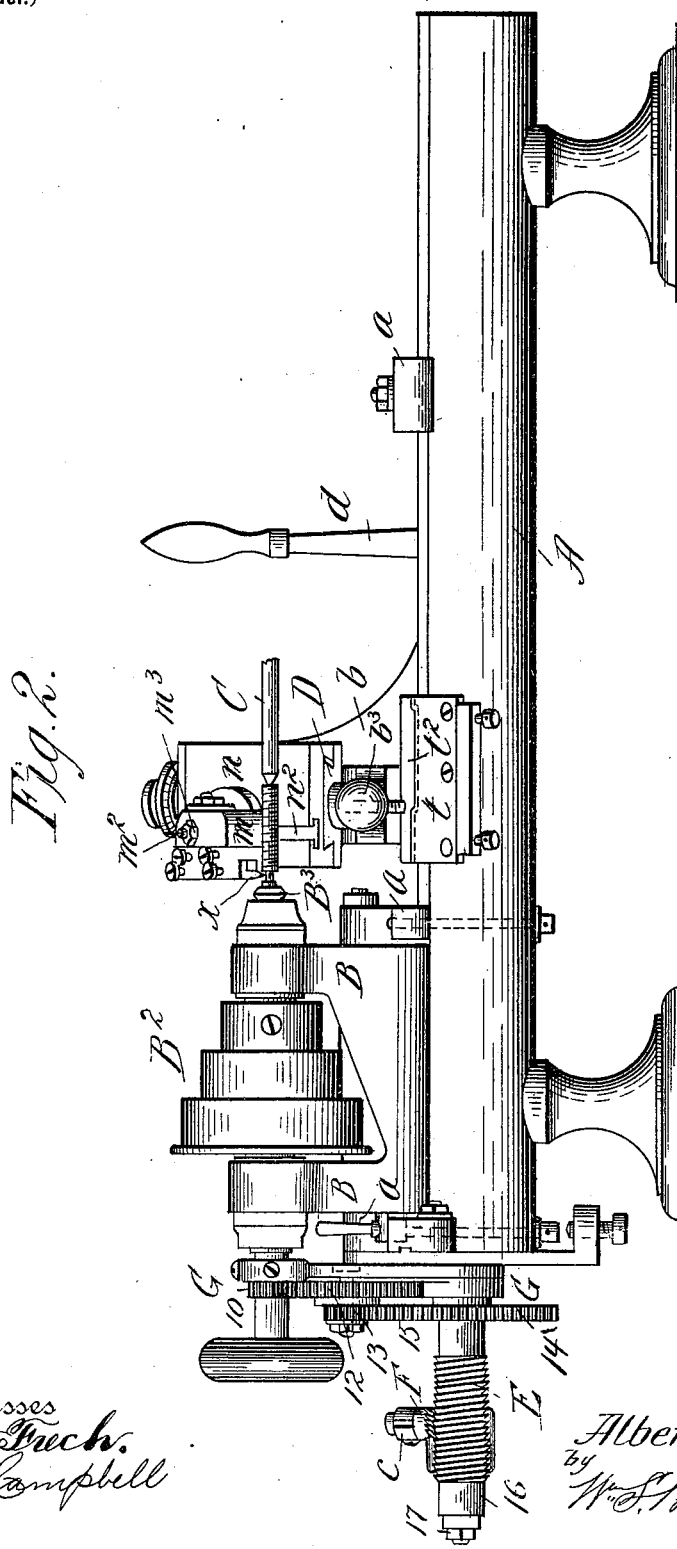
Figure 3:
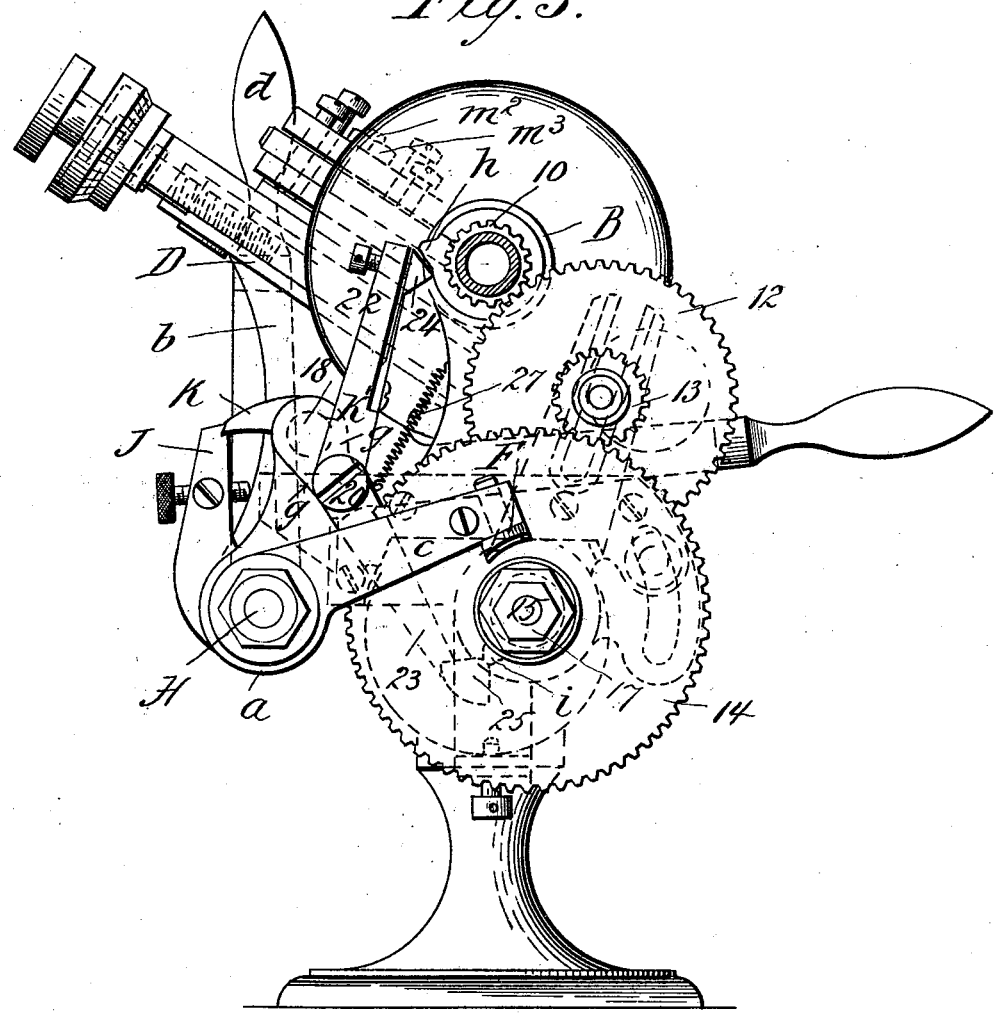

Figure 1 is a plan view of the lathe. Fig. 2 is a side elevation thereof. Fig. 3 is an elevation at the head-stock end of the lathe, and Fig. 4 is an elevation taken at the opposite end.

In the drawings the head-stock is shown, but the tail-stock is omitted, although the tail-stock center is shown in Figs. 1 and 2.

Figs. 3 and 4 are drawn on a somewhat larger scale than Figs. 1 and 2.

Similar letters and figures of reference indicate corresponding parts in all of the views.

In the drawings, A represents the bed of the lathe.

B represents the head-stock, having the cone-pulleys $B^2$, in which is here shown a centering-chuck $B^3$.

C represents the tail-stock center, and D represents the carriage or tool-carrier.

E represents the hob or feed-screw, and F represents the nut or segment for engagement therewith.

The letter G represents the back gears, the same consisting of the pinion 10, fixed on the head-stock spindle, the gear-wheel 12, which is interchangeably and detachably mounted and with which said pinion 10 is in mesh, the pinion 13, compounding with the said gear-wheel 12, and the gear-wheel 14, with which said pinion 13 is in mesh and which gear 14 is affixed on the shaft or arbor 15, on which the hob is mounted, or in any well-known manner to cause the hob to turn as one therewith. The hob is detachable and interchangeable and any one of a number of these hobs having threads of variable pitch and fineness may be set upon the hob-arbor 15 or the hob-journal and held by the collar or bushing 16 and nut 17.

At the rear side of the lathe-bed is a horizontal longitudinally-ranging rocker-shaft H, supported to rock in and to be endwise movable through the brackets therefor, $a\ a$, and it is upon the bracket $b$, journaled on this rock-shaft H, that the tool-carriage D is mounted. The tool-carrier has a back-and-forth swinging movement independently of the bar H.

The nut F is carried at the extremity of an arm $c$, which is also affixed firmly and rigidly on said rock-shaft, and the rock-shaft is provided with the lever-arm $d$, upwardly or suitably otherwise extended to be in a convenient position of grasp by the operator, who by a forwardly-swinging pressure may throw under the proper conditions the nut into engagement with the hob.

At the rear of the lathe, at a place about behind the head-stock, there is rigidly mounted on the aforesaid rocker-shaft H a pawl or engagement member J.

K represents a web, blade, or bar located at the rear of the head-stock and ranging horizontally and longitudinally and having a rear straight edge, the length of which is somewhat in excess of the longitudinal travel required for the tool-carrier, and this blade is mounted to rock or oscillate on a horizontal longitudinal axis by being journaled, as indicated at the points 18 18, in any suitable supports therefor, as in the same lugs $a\ a$, in and through which the bar H is supported and slides. The said blade K has as one therewith, either by being formed integrally therewith or by being affixed thereto, a crank-like projection $g$, on which is mounted for a limited swinging movement in a vertical plane crosswise of the machine a two-armed lever K', the pivotal point of support of this lever on the said crank projection of said rocking blade being indicated at 20 in Figs. 1 and 3. One arm 22 is upwardly extended into proximity to the head-stock pinion 10, while the downwardly-extended arm 23 of this said lever K' is extended into proximity to and alongside or adjacent the hob-gear 14. The lever-arm 22 has the nose 24, and the lever-arm 23 likewise has a nose at its end 25.

On the head-stock spindle, next to the head-stock-spindle pinion, is a disk or part 26, which to all intents and purposes may be regarded as one with the said pinion as it moves in unison therewith, and this disk has a single tooth $h$, adapted once every time it makes a complete revolution to pass or to come into engagement with the nose 24 of the lever-arm 22 and by its impingement with said nose, as hereinafter explained, to bodily swing the lever K', the upper arm thereof then moving rearwardly until the said tooth or projection $h$ has passed said nose 24.

27 represents a spring, the same as shown in Fig. 3, being applied for exerting a forward upward pressure on the arm 23 of the two-armed lever K' and tending to keep the arm 22 of such lever swung off from the path of the tooth $h$, and so that such tooth $h$ will not impinge against and trip the lever, except at such times as the tooth $i$ is coincident with the lever-arm nose 25 and has swung the lever against the spring to bring the other lever-arm nose 24 within the path of the revolving tooth $h$.

There is on a suitable collar or fixture, which is an adjunct of the hob and its gear 14 inasmuch as it moves in unison therewith, a tooth $i$, (see Fig. 3,) which once in its every revolution comes opposite to and practically in passing contacts on the end of the nose of the lever 23, although these parts $i$ and 25 do not come into a tripping engagement necessarily. There will be occasions when projection $h$ is in engagement with nose 24 at the same instant that the tooth or projection $i$, turning with the hob, comes opposite nose 25. Now as the lever K' must be swung in order to allow projection $h$ to pass lever-point 24, and as the hob projection $i$ prevents the arm 23 of the lever moving toward the axis of the hob, the point of contact between $i$ and 25 now becomes the fulcrum from which the lever must move, and its swinging movement must necessarily cause the swinging of the aforesaid crank projection of the blade K, so that the latter becomes disengaged from the pawl J, now forming no obstruction to prevent the said pawl from forwardly swinging as impelled by the rocking force exerted on the rock-shaft H by the pressure on the hand-lever $d$, and the nut may fall into engagement and bottom in the threads of the hob and the longitudinal feed movement of the tool-carrier will instantly commence. It is to be here stated that assuming that a screw-thread has been partially cut, having started on the work at the commencement of the job by having the head-stock-spindle projection $h$ and lever-arm nose 24 and the hob projection $i$ and lever-arm nose 25 both coinciding or in juxtaposition, as indicated in Fig. 3 of the drawings, and the tool-carrier starting from the zero-point of the machine—that is, by having the stop 31 on the sliding rocker-shaft against the bracket $a$ toward the right-hand end of the lathe-bed—it will be here noted that the feed commences and proceeds from this stop and the tool-carrier has its run and makes the first partial cut or chasing. The tool-carrier having gone to the end of its feed course, or so far as desired, the operator swings the lever $d$ rearwardly, carrying the tool away from the work and lifting the nut out of engagement with the hob, thereby stopping the feed of the carriage and at the same time permitting the blade K to fall into its normal position relative to the pawl J, as seen in Fig. 3, preventing the nut from reëngaging and the tool from again being reëntered into the work. The carriage is now returned to the zero position before referred to, the partially-cut work all the while rotating, and having brought the carriage back to said zero-point or starting-place the operator again exerts a forward pressure on the lever $d$. Now assuming that the feed by the hob is ten teeth to the inch and the head-stock spindle is by the gearing rotated to turn two-and-a-half times as fast it becomes plain that there are recurring instants during the rotations of the hob and work that the tool may properly be started on its feed movement, and if started on its feed movement at such proper instant that when the tool is fed up to take a deeper cut in the work it will exactly bottom or coincide, so far as its point or center is concerned, with the center of the thread, and it will be further manifest that the aforementioned proper instant of feed commencement eventuates when both head-stock-spindle projection $h$ and hob projection $i$ are simultaneously both opposite their respectively proximate lever extremities 24 25, at which instant the blade K is swung so as to release itself from engagement with the pawl J, which release instantly permits the nut to move through the very short space required to engage the hob and start the tool-feed, and in the example stated, wherein there are ten threads to the inch of the hob or lead-screw, and the work is rotated so fast as to cut twenty-five threads to the inch, the coinciding relations will recur at intervals comprising five rotations of the work, five being the common divisor of the multiple of both ten and twenty-five. Assuming that there is an interchange of a twelve-thread hob and of gearing for a thirty-four-thread work-feed, the coinciding recurrences will be once in every seventeen turns of the work and every six turns of the hob, as seventeen is the common divisor of the least common multiple of twelve and thirty-four. It will be seen that the operator is not called upon to exercise any unusual care or calculation and that he cannot by any probable carelessness cause the tool to enter the cut previously made otherwise than exactly true, he only being called upon to fully return the tool-carrier by sliding it to the abutment for the starting-point and maintaining a comparatively slight pressure on the hand-lever $d$ to insure that the nut is instantly forced into engagement with the hob so soon as the peculiarly operating mechanism permits this to be done. Nearly all screw-cutting lathes are provided with a variety of interchangeable back gears and also interchangeable hobs of varying pitch or fineness of threads, so that it practically becomes possible to cut threads on any work of any number to the inch. Any changing of the hob and of the gearing whereby the work is caused to rotate at any oddly-variable speed from the hob in no way alters or affects the manner of the operation of the mechanism involved in this invention, except that, as obvious, the coinciding instant when the nut is permitted to be entered into engagement with the hob will recur at different intervals.

The thread cutting or chasing tool $x$ in the accompanying drawings is shown as mounted on a fixture $m$, which by the swivel and clamping screw $m^2$ and nut $m^3$ is held in any position desired in a line transversely of the slide $n$, which has the slot $n^2$ therein, the said slide $n$ being transversely movable on the carrier D, the usual micrometer adjusting-feed being provided, as indicated at $o$. By loosening the nut $m^3$ and sliding the fixture $m$ transversely forward and also turning the said part $m$ a quarter-way around, so as to bring the length of the tool to range longitudinally parallel with the axis of the head-stock spindle, the hereinbefore-described machine may be rendered available for cutting and recutting on a runover within the inner wall of an annular piece of work held by the chuck carried on the head-stock spindle.

It is to be noted that the bracket $b$, on which the tool-carrier D is mounted is provided with the forwardly-extended arm $b^3$, having the approximately vertical adjustable abutment member or screw $b^4$, which is adapted to be brought by its lower end in contact against the detachably-mounted form or pattern-plate $t$, located on the front of the lathe-bed. As the tool-carrier and nut F are permitted to be brought forward, so that the nut engages the hob or feed-screw, and the tool is close to the work or in cutting engagement properly in the thread thereof, as has been heretofore explained, the depth of the cut by the tool may be rendered variable by the contour of the edge $t^2$, along which the abutment $b^4$ of the tool-carrier arm has sliding contact, so that a tap or tapered threaded part may be practically cut.

I claim—

1. In a screw-cutting lathe and analogous machines, head-stock spindle or work-carrier, the tool-carrier and a hob or feed-screw, and means for rotating the work-holder and the hob at different speeds, the tool-carrier having as a connected part, a nut adapted to engage the hob, combined with means for retaining the tool-carrier removed from the work and said nut from the hob, and mechanism operative to permit said tool-carrier to approach the work, and the nut to engage the hob at intervals when a certain point on the rotating head-stock spindle and on the rotating hob are simultaneously brought to given coinciding points, for the purpose set forth.

2. In a screw-cutting lathe and analogous machines, the rotatable work-carrier and a rotatable hob or feed-screw, the tool-carrier and means for rotating the work-holder, and hob at any desired relative speeds, the tool-carrier having as a connected part, a nut adapted to engage the hob, devices adapted for engagement whereby the nut is held disengaged upon the hob and the tool-carrier withdrawn from the work, and mechanism for releasing the engagement of said devices at intervals when points revolving with the work-holder and with the rotating hub are brought to coinciding points for the purpose set forth.

3. In a screw-cutting lathe or analogous machine, a feed-screw and a rotatable work-holder, and means for simultaneously rotating said screw and work-holder; a tool-carrier and a connected part adapted to engage the feed-screw; and a mechanism operating to permit the engagement of the screw-engaging part with the feed-screw at any instant whenever a number of turns of the work-holder equals a divisor of the common multiple of rotations of both the screw and work-holder, substantially as and for the purpose set forth.

4. In a screw-cutting lathe or analogous machine, a feed-screw and rotatable work-holder and means for rotating both said holder and screw, and a tool-carrier and a connected part adapted to have movements, the one toward and from the work and the other toward and away from engagement with the feed-screw, and both longitudinally movable in unison, and a mechanism operating to permit the engagement of the screw-engaging part with the screw at any instant when the number of turns of the work-holder equals a divisor of the common multiple of the rotations of both the work-holder and feed-screw, for the purpose, substantially as described.

5. In a screw-cutting lathe, the combination with the feed-screw, the work-holder, and means for rotating both, of a tool-carrier mounted on a rocking support, which carrier is arranged for swinging or rocking movement independently of, and relative to said rocking support, and a longitudinal feed movement in unison with said rocking support, a screw-engaging nut which, with said tool-carrier, is also adapted for a longitudinal feed movement, and a swinging movement in unison with the endwise movement of said rocking support and mechanism operating to permit the engagement of the nut with the feed-screw, at those instants when a number of the turns of the work-holder equals a divisor of a common multiple of the rotations of both the feed-screw and work-holder, substantially as described.

6. In a screw-cutting lathe, the combination with the feed-screw and work-holder and means for rotating both at any required relative speed, a longitudinally-sliding and transverse rocking tool-carrier, and a feed-screw-engaging part or nut having connection with the tool-carrier and adapted to move longitudinally in unison therewith, a pawl or engagement member adapted to prevent the transverse movement of the nut toward the screw projections, one revolving in unison with the feed-screw and the other in unison with the work-holder, and a lever, by adjacent portions of which the said revolving projections pass, and which is so arranged that when both said projections simultaneously or coincidingly come adjacent the proximate portions of said lever, the latter will be moved and cause the said pawl to be placed in its position of disengagement permitting the said screw-engaging part to take into the screw, substantially as described.

7. In a screw-cutting machine, in combination, the rotatable work-holder and the hob or feed-screw and means for rotating both at any required relative speed, the rocking bar H and journal-supports therefor in which said bar rocks and also longitudinally slides, the tool-carrier and screw-engaging nut both supported on said bar and a pawl or engagement member also provided on said bar, a rocking bar or blade K adjacent which the said pawl is located for its engagement therewith, having a crank or lever like projection $g$, a lever K' pivoted on said projection, and a tooth or projection rotatable in unison with the work-holder and another projection rotatable in unison with the feed-screw, and one of said projections serving to trip the lever, swinging it from the place of fulcrum contact which it has on the other projection when both said projections simultaneously are rotated to be coincident with the adjacent portions of said lever, substantially as and for the purpose set forth.

8. In a screw-cutting machine, in combination, the rotatable work-holder and the hob or feed-screw and means for rotating both at any required relative speed, the rocking bar H and journal-supports therefor in which said bar rocks and also longitudinally slides, the tool-carrier and screw-engaging nut both supported on said bar and a pawl or engagement member also provided on said bar, a rocking bar or blade K adjacent which the said pawl is located for its engagement therewith, having a crank or lever like projection *g*, a lever pivoted on said projection, and a tooth or projection rotatable in unison with the work-holder and another projection rotatable in unison with the feed-screw, and one of said projections serving to trip the lever swinging it from the place of fulcrum contact which it has on the other projection when both said projections simultaneously are rotated to be coincident with the adjacent portions of said lever, a stop 31 for limiting the movement of the sliding and rocking bar and a handle or like means for rocking said bar, substantially as described.

9. The combination with the head-stock spindle having the projection *h*, the feed-screw having to turn in unison therewith, the projection *i*, and gearing between and connecting said spindle and screw, the sliding and rocking bar H having the tool-carrier thereon and also the nut F and provided with the pawl J, the longitudinally-arranged rocking blade or bar K having the crank-like projection *g* on which is pivotally mounted the lever K′, an extremity of which is extended into proximity to the plane of rotation of the screw projection *i* and the other being extended into proximity to the spindle *h* and provided with the tooth or nose 24, and means for manually rocking the bar H, substantially as described.

10. In a screw cutting or chasing machine, of the character described, the combination with the rotatable work-carrier, and the rotatable feed-screw and means for driving both at any relative speed, of a rocking support adapted for a longitudinal movement on which a screw-engaging nut is mounted, and on which the tool-carrier is mounted to move longitudinally in unison therewith, and to have thereon, independently a transverse rocking movement, said tool-carrier being provided with an abutment, and a form or pattern along which said abutment has a moving contact, engagement devices whereby the rocking support is prevented from a movement to present the nut into engagement with the feed-screw, and mechanism operating to disengage said devices at any instant whenever a number of turns of the work-holder equals a divisor of the common multiple of rotations of both the screw and work holder, substantially as described.

In testimony that I claim the foregoing as my invention I have hereunto signed my name in presence of two witnesses.

ALBERT LATHAM.

Witnesses:
WM. S. BELLOWS,
M. A. CAMPBELL.